United States Patent [19]
Handermann

[11] Patent Number: 5,227,236
[45] Date of Patent: Jul. 13, 1993

[54] PROCESS FOR PREPARING THERMOPLASTIC MATRIX FIBER-REINFORCED PREPREGS AND COMPOSITE STRUCTURE PRODUCTS FORMED THEREBY

[75] Inventor: Alan C. Handermann, Ashville, N.C.

[73] Assignee: BASF Aktiengesellschaft, Ludwigshafen, Fed. Rep. of Germany

[21] Appl. No.: 737,527

[22] Filed: Jul. 29, 1991

[51] Int. Cl.⁵ .................................. B32B 7/00
[52] U.S. Cl. .................................. 428/361; 428/251; 428/369; 428/373; 428/377; 428/378; 428/380

[58] Field of Search ............... 428/361, 373, 377, 378, 428/380, 251, 369

Primary Examiner—B. Hamilton Hess
Assistant Examiner—Richard C. Weisberger
Attorney, Agent, or Firm—William G. Conger

[57] ABSTRACT

Hybrid and commingled yarns containing reinforcing fibers and thermoplastic matrix fibers when sized with a dispersion or emulsion having a dispersed phase containing a thermoplastic compatible with the thermoplastic of the matrix fibers but having a lower melting point allow preparation of thermoplastic matrix fiber reinforced composite structures at reduced consolidation temperatures, cycle times, and/or consolidation pressures without loss of composite physical properties.

6 Claims, 13 Drawing Sheets

PROCESS FOR PREPARING THERMOPLASTIC MATRIX FIBER-REINFORCED PREPREGS AND COMPOSITE STRUCTURE PRODUCTS FORMED THEREBY

BACKGROUND OF THE INVENTION

1. Field of the Invention

The present invention pertains to the field of fiber-reinforced thermoplastic composites. More particularly, the invention pertains to an improved process for preparing such composite structures wherein the time required to fully consolidate the composite is reduced significantly, and to the products produced thereby. This improvement is achieved through the use of commingled yarn containing reinforcing fibers and thermoplastic matrix fibers which have been sized with an emulsion or dispersion of a thermoplastic which is melt-compatible with the thermoplastic fibers but which has a melting point significantly lower than the thermoplastic matrix fibers.

2. Description of the Related Art

Thermoplastic matrix fiber-reinforced composites are now well known items of commerce. Such products may be prepared by numerous methods. Glass mat reinforced polypropylene composites, for example, are prepared by impregnating needled or non-needled continuous or chopped fiber layers with molten polypropylene to form an intermediate, somewhat lofty product, which may then be consolidated under heat and pressure to form composite structures having a thickness considerably lower than the intermediate product. Such products are particularly useful in the transportation industry for body panels and engine covers. Complex shapes are difficult to achieve with this process.

A similar process is resin transfer molding. By this process, a plurality of fiber-reinforced laminae interspersed with sheets of thermoplastic or having thermoplastic sheets exterior to one or both sides of the laminate layup are consolidated under heat and pressure whereupon the thermoplastic flows into the fiber reinforcing laminae. Such products often do not have the same physical properties as thermoplastic composites formed from thermoplastic impregnated fiber-reinforced prepregs.

The use of thermoplastic impregnated fiber reinforced prepregs is now commonplace. Such prepregs are stacked together and consolidated under heat and pressure. However, because the prepregs themselves are stiff and "boardy", it is difficult and in many cases impossible to prepare composites which are other than planar or modestly curvilinear.

Improvements in forming thermoplastic composites of complex shapes are illustrated by the use of thermoplastic powder impregnated prepregs and the use of hybrid or commingled yarns. In the former case, unidirectional or woven fiber reinforcement is impregnated with the necessary quantity of thermoplastic in the form of a fine powder. A binder, generally a high molecular weight polyoxyethylene glycol, polyvinylalcohol, polyacrylate, polyvinylpyrollidone or similar water or alcohol soluble polymer is usually necessary to provide integrity, particularly with unidirectional fibers, and to prevent loss of the thermoplastic powder from the prepreg during shipping and handling. The presence of the binder can result in an undesirable decrease in composite physical properties. Such powder impregnated prepregs, however, can be utilized to prepare composites of complex shapes due to their drapeability, particularly when wet.

Hybrid and commingled yarns have also proven successful in preparing composites of complex shapes. In the remainder of the specification, the term "hybrid yarn" will be used to define yarns which are combinations of reinforcing fibers and thermoplastic matrix fibers, whether truly commingled, i.e. having relatively statistical or uniform distribution of the different fiber types; or whether served, core/shell, partially commingled, or co-wound. Of course, commingled yarns are the preferred hybrid yarns. The term "thermoplastic matrix fibers" refers to the hybrid yarn fibers which will fuse during consolidation to form the thermoplastic matrix to distinguish these thermoplastic fibers from thermoplastic fibers which may serve as reinforcing fibers, and which do not fuse during consolidation.

Commingled yarns may be prepared as disclosed in U.S. Pat. Nos. 4,799,985 and 4,818,318 which are herein incorporated by reference. In general, fiber reinforcing tows are spread to form a unidirectional tape while thermoplastic tows are similarly spread and superimposed upon the fiber tape generally under low or relatively modest pressure. Combs or air jets are then utilized to more thoroughly intermix the reinforcing and thermoplastic fibers whereupon the commingled tape is then reformed into a commingled tow or yarn. In some cases, a slight twist is imparted to the yarn to aid in maintaining its integrity. The commingling produced by this process results in a product having a uniform distribution of reinforcing fibers and thermoplastic fibers. This uniform distribution is important, as the physical properties of consolidated structures decrease when non-uniform fiber distribution occurs, a condition aggravated as the melt viscosity of the thermoplastic increases. While cowound yarns (essentially not commingled) have been used with low melt viscosity thermoplastics such as the aliphatic nylons, even here the commingled yarns produce composites with superior properties when compared to cowound yarns of the same composition.

In order to weave or braid hybrid and commingled yarns, a certain degree of yarn integrity is necessary. Limited success has been achieved by twisting the yarn, for example at 0.2–0.8 twists per centimeter. However this level of twist is not totally satisfactory since it tends to damage the delicate reinforcing fiber filaments. Moreover, the composite properties are reduced due to the twist. To assist in fiber integrity, sizes may be applied. However use of traditional sizes such as polyoxyalkylene polyethers, polyvinylpyrollidone, polyvinylalcohol, polyvinylacetate, polyacrylates and the like, while capable of preparing tow with improved weaving and braiding characteristics, again results in a decrease in physical properties which may be severe at times depending on the chemical makeup of the size. This decrease in physical properties becomes more severe as the level of size increases. However, even when such sizes are applied at practical levels, moderate twist must often be applied to further assist yarn integrity.

The commingled yarns produced as described above may be woven into fabric "prepregs" or braided into a variety of braided "prepregs" including ribbons, ropes, and hollow tubular braids. In the preparation of composite products, one or more of such prepregs are laid up together and consolidated under heat and pressure. The time required for full consolidation varies with the melt viscosity of the thermoplastic, the degree of commingling, and the pressure applied. Lengthy consolidation times are commonplace, especially with non-planar structures which do not lend themselves to application of high consolidation pressures. These long consolidation times increase the cost of the finished products.

It would be desirable to devise a process whereby the twist imparted to commingled yarns could be reduced significantly or avoided entirely, and where any size applied would not significantly lower physical properties of the finished composite. It would further be desirable to lower the consolidation time and/or pressure in order to produce finished products in a shorter time and/or at less expense.

SUMMARY OF THE INVENTION

It has now been surprisingly discovered that hybrid and preferably commingled yarns sized with a dispersion or emulsion of a polymer compatible with the thermoplastic fibers of the commingled yarn but which has a lower melting point may be woven or braided with little or no twist. Yarns thus sized are able to be consolidated into finished products with reduced consolidation times, often also with reduced consolidation pressures, without significant loss in mechanical properties as compared with unsized, untwisted hybrid yarn derived products, or similar products sized with ordinary textile size compositions.

DESCRIPTION OF THE PREFERRED EMBODIMENTS

Figure 1:
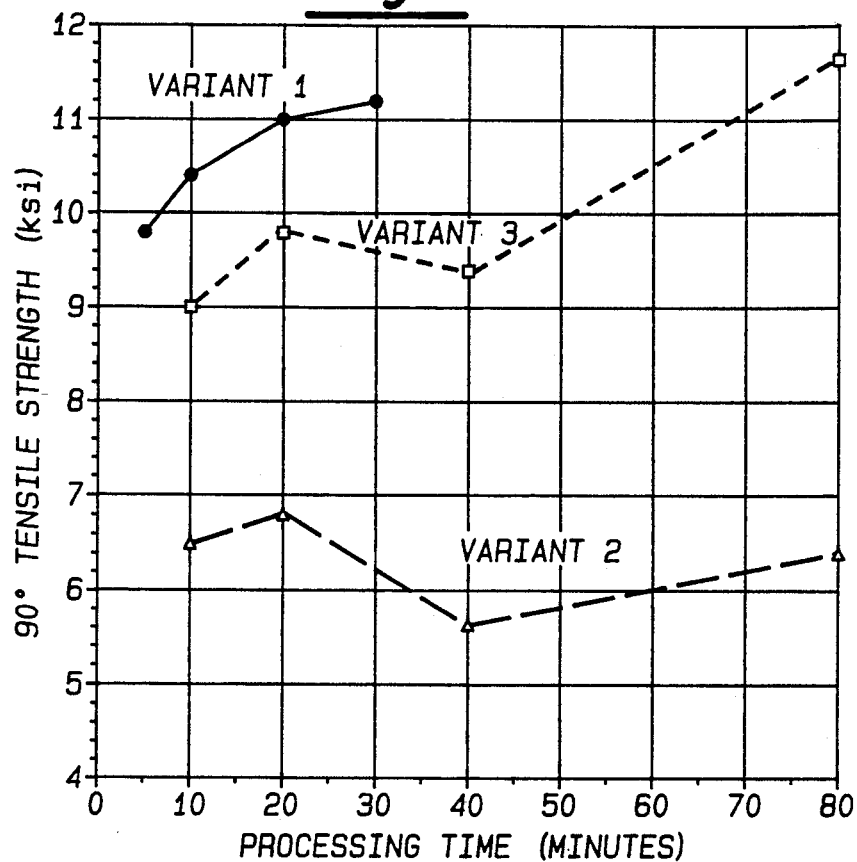
FIGS. 1, 2 and 3 illustrate the relationship of 90° tensile strength, 0° flexural strength, and 0° flexural modulus, in relation to consolidation time for a laminate within the scope of the invention (curves A) and two comparative laminates (curves B and C).

Hybrid yarns are now available commercially. These yarns contain one or more types of reinforcing fibers including carbon fibers (broadly defined to also include carbon/graphite or graphite fibers), glass fibers, quartz fibers, ceramic fibers, boron nitride fibers, silicon carbide fibers, and other inorganic fibers. Reinforcing fibers may also include organic fibers which have significantly higher melting points than the thermoplastic matrix fibers and which are not appreciably solubilized during consolidation by the molten thermoplastic matrix resin. For example, polyetherketone fibers, e.g. Ultrapek ® fibers supplied by BASF Aktiengesellschaft or polyether sulfone fibers, for example Ultrason ® E and Ultrason ® S, also supplied by BASF AG may be utilized as reinforcing fibers with lower melting thermoplastic matrix resins such as polyethylene, polypropylene, nylon 6 and nylon 66, polyacetals, and the like. High temperature polyalkylenes, e.g. Spectra ® fibers, polyamide fibers, polyetherimide fibers, and the like may also be used as reinforcing fibers with the appropriate thermoplastic matrix resin fibers.

The thermoplastic matrix resin fibers in the hybrid or commingled product will have a lower melting point than the reinforcing fibers. When inorganic fibers are utilized, the choice of thermoplastic matrix fiber is virtually unlimited, and high melting thermoplastics such as the polyarylene ether ketones, polyarylene ether sulfones, polyimides, polyetherimides, all-aromatic nylons (aramids), polybenzimidazoles and liquid crystalline polyesters may be utilized. Lower melting temperature thermoplastics which may be suitable are the various aliphatic nylons, e.g. nylon 6, nylon 66, nylon 44, nylon 612; the polyalkylenes, for example polyethylene and polypropylene; polyoxymethylene; polyacetals; polyesters, e.g. polyethylene terephthalate, polybutylene terephthalate, polycyclohexanedimethenol terephthalate, the various polyalkylene adipates, and the like. This list of thermoplastic matrix resin fibers, like the lists of reinforcing fibers previously given, is illustrative only and not limiting.

Thermoplastic fibers, whether thermoplastic reinforcing fibers or thermoplastic matrix fibers, are generally spun in processes which require a fiber finish. The use of such finishes provides lubrication of the fiber and assists in preventing fiber breakage and snags. Such finishes generally cause a decrease in physical properties of fiber-reinforced thermoplastic composites and thus their use should be avoided wherever possible. In general, lower levels of finish still provide acceptable products. Water or solvent soluble finishes may be removed by washing the spun fibers.

The commingled yarns may be prepared as previously stated, for example by the processes disclosed in U.S. Pat. Nos. 4,799,985 and 4,818,318. Alternative methods of preparation are also possible, for example by spreading and combining over rollers and bars, etc. The method of preparation of the commingled fibers is not of particular importance, however, the distribution of reinforcing and thermoplastic fibers in the commingled yarn should be as uniform as possible. This uniformity may vary with the method of preparation and with the fiber types incorporated therein. It is possible to prepare hybrid yarns which while not being capable of the designation "commingled," nevertheless perform in a satisfactory manner in some applications. Examples of such products include overwrapped or "served" yarns as taught by U.S. Pat. No. 4,539,249; core/shell yarns wherein the greatest part of one fiber resides in the interior, or "core," while the greatest part of the other fiber resides exterior to this core; and co-wound products prepared by literally cowinding one or more fiber reinforcing tows with one or more thermoplastic fiber tows either with or without any further degree of commingling (intermixing) of the fiber types, but generally with twist imparted to maintain yarn integrity.

Products such as those described above which exhibit incomplete uniformity generally will not permit fabrication of composites with optimum properties, although the difference in properties can sometimes be minimized as the melt viscosity of the thermoplastic fibers decreases and the consolidation pressure of the fabrication process increases.

The hybrid yarns in the present invention are sized with a thermoplastic emulsion or dispersion, the solids of which have a lower melting point than the thermoplastic matrix fibers but are compatible with the thermoplastic matrix fibers. By the term "compatible", it is meant that the thermoplastic of the size is at least partially soluble or preferably miscible with the thermoplastic matrix fibers in the melt condition, at the concentration utilized.

In the most usual situation, the thermoplastic size dispersion will contain particles of a thermoplastic which is similar in chemical composition to the composition of the thermoplastic matrix fibers. For example, the thermoplastic size may be a lower molecular weight oligomer prepared from the same monomers as the thermoplastic matrix fiber, or perhaps a polymer having additional monomers to lower its melting point, for example a terpolymer rather than a copolymer, or a copolymer rather than a homopolymer. The melting point of the thermoplastic size is preferably at least 30° C. lower than the melting point of the thermoplastic matrix resin, more preferably 60° C. lower.

Thus, in the case of polycaprolactam, or nylon 6, the size may consist of polycaprolactam prepared at a lower molecular weight, and having a lower melting point. With respect to nylon 66, the size may be again a lower melting, lower molecular weight oligomer, as may be prepared, for example, by reacting an excess of 1,6-diaminohexane with the adipic monomer or vice versa. As nylon 66 has a higher melting point in general than nylon 6, a nylon 6 dispersion could be used with nylon 66 as their structures, though different, are similar enough to be compatible. Also useful with these and other nylons, for example nylon 610 and nylon 612 would be nylon terpolymers where an nylons are commercially available, for example the ELVAMID® nylon multipolymer resins from DuPont.

In the case of the polyarylene ether ketones, for example those variously described as PEK, PEEK, PEKK, PEKEK, etc., lower molecular weight oligomers having the same repeating structure, or a lower melting polyarylene ether ketone having a different repeating structure (e.g. PEK with PEKK) may be utilized as well as terpolymer polyarylene ether ketones. The same applies also to polyarylene ether sulfones, polyarylene ether sulfides, polyarylene sulfides and like polymers.

In the case of the polyimides, again, lower molecular weight polyimides may be suitable as a size. Polyetherimides would be expected to be suitable also. In many cases, a polymer having a completely different structure from that of the thermoplastic reinforcing fibers may also be suitable. A simple test would be to attempt to melt blend a small portion of the lower melting thermoplastic size into the thermoplastic matrix resin. If total or substantial solubility is achieved, the proposed size having dissimilar structure is likely suitable.

However, in any case, final suitability can be assessed by preparing test plaques and measuring physical properties as described infra, and by assessing the consolidation time and pressure required to form a laminate from the thermoplastic sized commingled yarn. In general, a suitable thermoplastic size will have little effect on physical properties of the finished composite as compared to unsized hybrid yarn, but with its lower melting point, it will lower the consolidation time at a given temperature and pressure necessary to achieve a quality composite part.

Examples of chemicals which do not constitute a size within the meaning of this invention are the polyoxyalkylene glycols and polyols, polyacrylic acids, polyacrylates, polyvinylpyrollidones, polyvinylalcohols, low melting esters such as the esters of glycol with fatty acids, and similar relatively low melting compositions.

The thermoplastic size dispersion is generally prepared in aqueous or low boiling organic media as the continuous phase. Water is the preferred continuous phase for toxicological, safety, and environmental reasons. However, low boiling solvents such as acetone, methanol, ethanol, isopropanol, methylethylketone and similar solvents may be utilized provided that th thermoplastic matrix fibers do not dissolve in the solvent selected. Mixtures of solvents, particularly aqueous mixtures such as methanol/water are also useful.

Suitable size dispersions may be prepared, for example, by dissolving a suitable thermoplastic into a solvent, adding the resulting solution to water and a surfactant with intensive mixing, preferably under conditions of high shear, to form an emulsion of the thermoplastic/solvent in the aqueous continuous phase followed by removal of the solvent by distillation to form a dispersion of the thermoplastic resin. For example, a solution of ELVAMID® POLYAMIDE, believed to be a terpolymer of caprolactam, adipic acid, hexanediamine, and decanediamine (a copolymer of nylon 6, nylon 66 and nylon 610) or ULTRAMID® IC, a product of BASF Aktiengesellschaft, dissolved in a low boiling alcohol, preferably ethanol or methanol in an amount of from 5 to about 20 weight percent, may be added to water and a surfactant under high shear to produce an emulsion/dispersion. This emulsion/dispersion is then distilled azeotropically until no alcohol is present.

The thermoplastic size of the subject invention may also be in the form of an emulsion. The continuous phase of such emulsions is preferably water, but may also be other solvents which have high volatility. The dispersed phase of such emulsions contains the thermoplastic size in the form of a solution which includes a solvent or as a solution of the thermoplastic in a heat-curable monomer which is liquid at room temperature and which also acts as a solvent for the thermoplastic. Such emulsions may be prepared, for example, by dissolving an alcohol soluble nylon in methanol or methanol/water mixtures at elevated temperature forming a solution containing from 10 to about 60 weight percent solids. This solution is then added to the continuous phase, preferably water, under conditions of high shear such that a stable emulsion is formed. The emulsion should have a solids content of from about 1 to about 20 weight percent, more preferably from about 5 to about 15 weight percent, and may contain from 5 to about 40 volume percent of dispersed phase. A surfactant, for example a poloxyalkylene block or homopolymer, a fatty amine, or oxyalkylated fatty amine, fatty alcohol, or fatty acid may be utilized to assist emulsion stability.

A further example of an emulsion size is the use of a solution of a bisphenol A epoxy resin and a soluble nylon as the dispersed phase. To form such dispersions, the nylon is first dissolved in a suitable solvent, e.g. methanol or methanol/trichloroethylene at concentrations of up to 50 weight percent thermoplastic or more. The epoxy resin is then added with stirring with or without a latent catalyst. The solution is then dispersed into the continuous phase. As with other emulsions, a minor quantity of a surfactant phase stabilizer may be added if necessary. A further example of such an emulsion would be an epoxy soluble thermoplastic such as MATRIMID® 5218 dissolved in a minor amount of a bisphenol A or bisphenol F epoxy. In such thermoplastic/reactive monomer emulsions, the reactive monomer may increase the integrity-maintaining effectiveness of the size as compared to a dispersion or emulsion of the thermoplastic alone, but should be present in a minor amount in the dispersed phase.

The solids content of the thermoplastic size may vary broadly, but in general will contain from about 5 weight percent to about 30 weight percent solids, preferably about 10 weight percent solids. The particle size of the dispersion may vary. On the high end, large particle sizes tend to limit the storage stability of the size. In general, the particle size as measured by a commercial particle size analyzer should be below 50μm, preferably below 20μm and more preferably below 10μm. Particle sizes of about 5μm or less have been found to work particularly well.

The size is applied by known methods in the textile industry, for example but not by limitation, by running the hybrid yarn through a trough filled with size followed, when necessary, by running the wet yarn between or around rollers an/or bars to eliminate excess size; by metering size onto the yarn as it passes along a roller, groove, bobbin or other device; and by spraying size onto moving fiber. Following its application, the hybrid yarn should be dried and optionally may be passed through a heated zone to fuse a portion or all of the thermoplastic size particles to the hybrid tow. However too high a level of fusion will result in a tow which does not retain the degree of flexibility desired for weaving and braiding. A two stage drying process may be effectively utilized where the first zone operates at a higher temperature to "flash off" the bulk of the solvent while the second zone operates at a lower temperature to facilitate thorough drying. Sized yarn not completely dry may show size migration from the interior to the exterior of the wound tow "package", if allowed to dry after being wound wet.

In the claims, the thermoplastic particle dispersion or emulsion size will be termed a "primary size." Where the primary size does not provide the desired degree of tow integrity, a "secondary size" which is an ordinary textile size, for example a polyvinyl alcohol, polyvinylacetate, polyvinylpyrrolidone, or low melting polyacrylate may be utilized in conjunction with the thermoplastic size. Such sizes are generally water soluble, and in many cases may be added to the thermoplastic size dispersion. When such sizes are utilized, the quantity should be as low as possible, for example 0.10 weight percent based on the weight of the fully sized tow, preferably less than 0.05 weight percent, and more preferably less than 0.03 weight percent. As stated previously, sizes of this type may detract from the physical properties of the finished composite articles, and thus use of as little of these secondary sizes as possible is desired. Most preferably, no secondary size is required.

The primary size should, as stated previously, contain a thermoplastic which is compatible with the thermoplastic matrix fiber, but will have a melting point or softening range which is lower. It is believed that the lower melting thermoplastic first melts and wets out the reinforcing fibers improving melt flow of the thermoplastic matrix fibers as well as acting in the manner of a solvent for the thermoplastic matrix fibers, improving fiber/matrix adhesion as a result. The finished products thus are different from products prepared from the same hybrid yarn but not sized, or sized only with a secondary size only, in that they will contain areas neighboring the reinforcing fibers where the lower melting thermoplastic size particles have been partially or fully dissolved into the higher melting thermoplastic, producing a thermoplastic alloy at the fiber/matrix interface.

The invention shall now be illustrated by the following examples which should not be interpreted as limiting the scope of the invention in any way. In the examples, all percents are percents by weight of the total composition unless otherwise specified. As to physical properties, 0° Flexural Properties were measured by a modified ASTM-D790 test protocol (3 pt. 32/1 span-to-depth ratio, rubber pads under loading noses to determine ultimate strength value, no pads for the initial modulus value); while 90° Tensile Properties were measured in accordance with ASTM-D3039. In the table STR is used as an abbreviation for strength, MOD for modulus, and STF for strain to failure. Short beam shear (SBS) was evaluated under ASJM-D2344. GENTON ® 310 is a 10% aqueous dispersion of ELVAMID ® 8063, having a Ph of from 7-9, and is available from the General Plastics Corporation, Bloomfield, N.J.

Test plaques were prepared from commingled yarn containing CELION ® G50-500 12K carbon fiber tow available from BASF Structural Materials, Inc., commingled with two yarns of polycaprolactam fibers. Each polycaprolactam yarn contained nominally 2000 denier fibers (g/9000m), resulting in a commingled product having a nominal resin content of 35-36 weight percent, capable of producing a composite having approximately 53 volume percent carbon fibers and a nominal density of 1.48 g/cm3.

Two types of polyamide fiber yarns were utilized to prepare commingled yarns having a relatively high degree of uniformity. Polyamide A is ULTRAMID ® BS-700, a fiber spinnable grade of polycaprolactam with a relative viscosity of 2.7 and no $TiO_2$ pigment, while Polyamide B is ULTRAMID ® BS-400S, a fiber spinnable grade of polycaprolactam having a relative viscosity of 2.4 and 0.03 weight percent $TiO_2$ pigment. Polyamide A has an apparent viscosity at 260° C. of approximately 90 Pa·s at a shear rate of 1000 sec$^{-1}$ and approximately 25 Pa·s at a shear rate of 10,000 sec$^{-1}$. Polyamide B, at the same temperature, has an apparent viscosity of approximately 40 Pa·s at 1000 sec$^{-1}$ and approximately 13 Pa·s 10,000 sec$^{-1}$. Both resins were spun into yarn utilizing a twistless, one-step spin/draw process from a circular cross-section 184 hole spinnerette utilizing conventional fiber spinning equipment. In order to facilitate spinning, a water based emulsion spin finish was applied to the fibers at a level of approximately 0.13 to 0.15 weight percent. Table 1 summarizes relevant fiber physical properties.

TABLE 1

| Example | Polyamide Fiber Type | Denier (g/9000 m) | Tenacity (gpd) | Elongation (%) | Modulus @ 5% (gpd) | Twist/in. |
|---|---|---|---|---|---|---|
| 1 | A | 2073 | 3.2 | 47.7 | 15.4 | 0.00 |
| 2 | A | 2116 | 3.4 | 50.4 | 15.2 | 0.00 |
| 3 | B | 2032 | 3.1 | 50.5 | 16.1 | 0.06 |

The polyamide yarns from table 1 were commingled with Celion ® G30-500 12 K carbon fiber tows to produce a commingled yarn having a nominal carbon fiber volume of 54 percent and nominal denier of 11,150 g/9000m. The polyamide resin content was approximately 35 weight percent. The commingled fiber yarn, was sized with a nominal 0.6 weight percent of Genton ® 310, an aqueous dispersion of alcohol soluble Elvamide ® 8063 supplied by the General Plastics Co.

Laminates were produced by frame wrapping the commingled yarn using a 16 inch (40.6 cm) wrap length and 11 inch (28 cm) wrap width. Two passes at a bandwidth of 0.0649 inches (0.1648 cm) were utilized to produce a 13"L × 11"W panel of 143 square inches (923 cm²) and with a thickness of 0.080 inches (0.203 cm). The panel was consolidated between Upilex ® release films at 500° F. and 100 psi for 20 minutes. Physical properties of the laminates are reported in Table 2

TABLE 2

| Example | Polyamide Fiber From Example # (see Table 1) | 0° Flexural Properties | | 90° Tensile Properties | | | |
|---|---|---|---|---|---|---|---|
| | | STR (ksi) | MOD (msi) | STR (ksi) | MOD (msi) | STF (%) | STR (ksi) |
| 4 | 1 | 166 | 15.8 | 8.0 | 1.06 | 0.75 | 8.6 |
| 5 | 2 | 177 | 15.6 | 8.6 | 1.05 | 0.82 | 9.2 |
| 6 | 3 | 171 | 15.3 | 10.0 | 1.11 | 0.90 | 8.6 |

Figure 2:
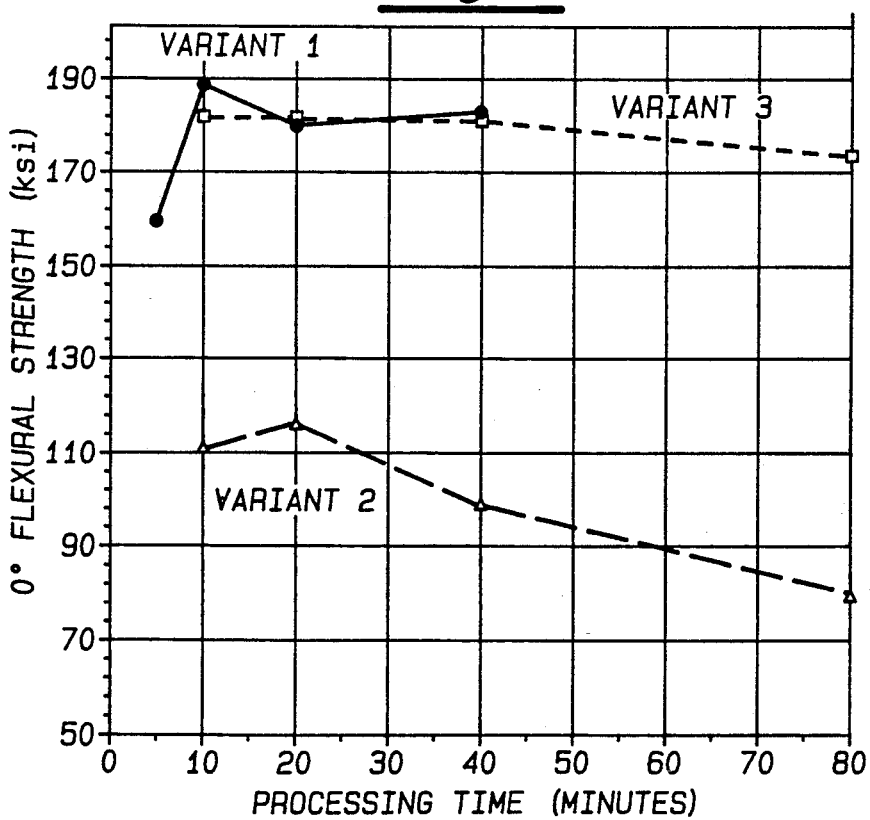
Figure 3:
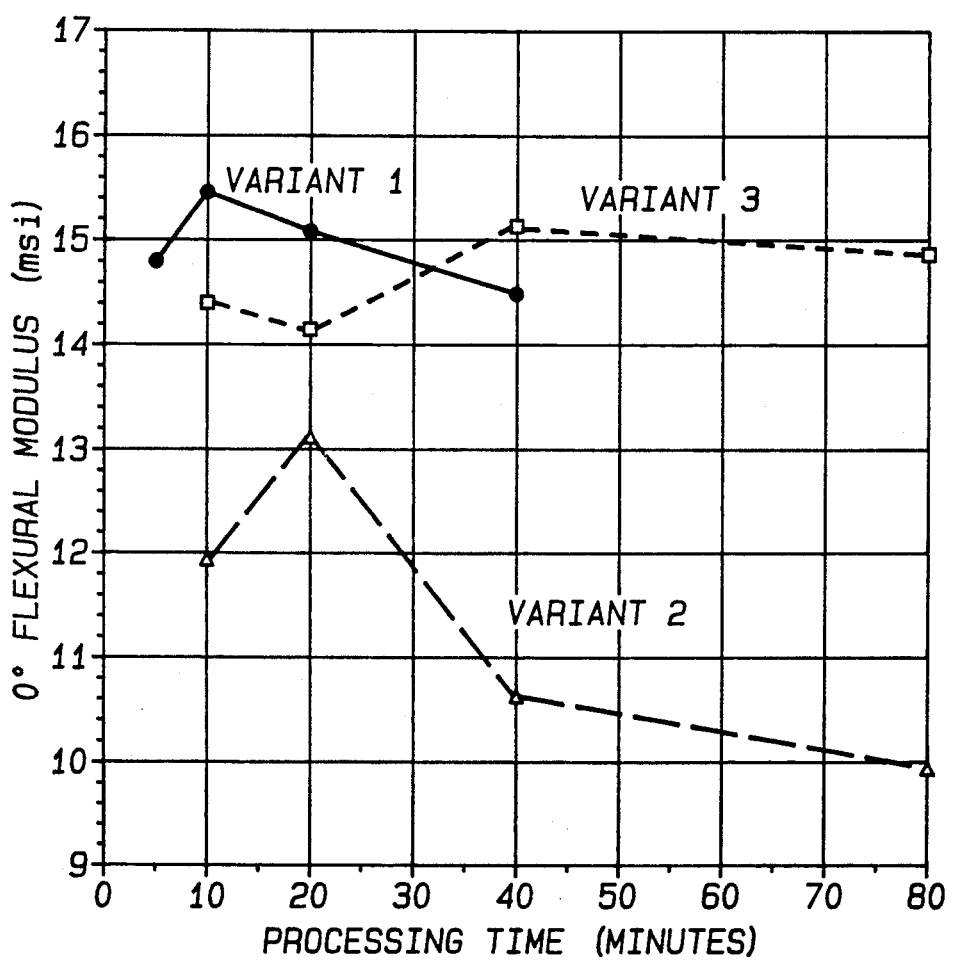
Figure 4:
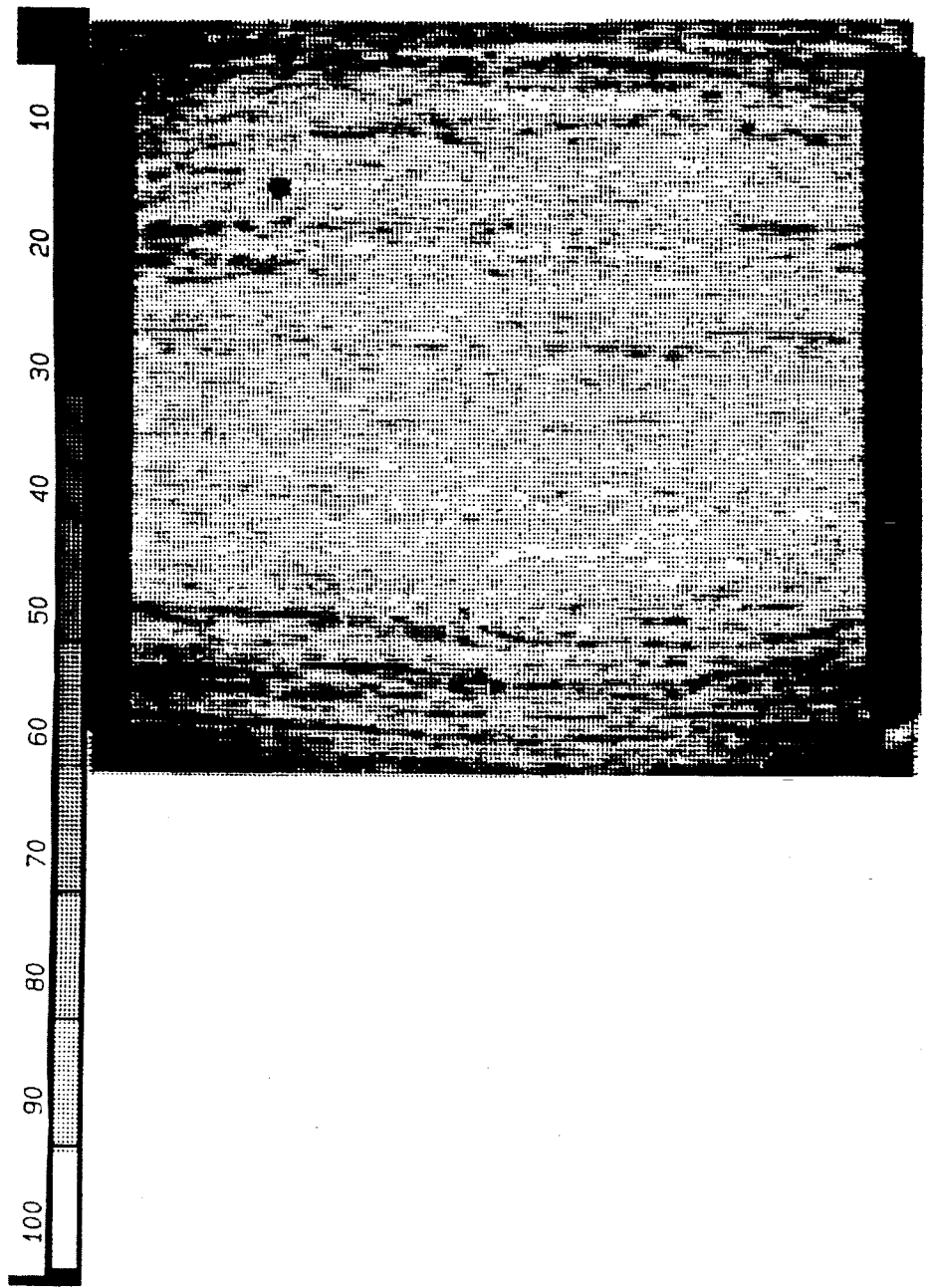
FIGS. 4 through 14 are C-scans of frame wrapped laminates showing areas of laminate porosity.
Figure 5:
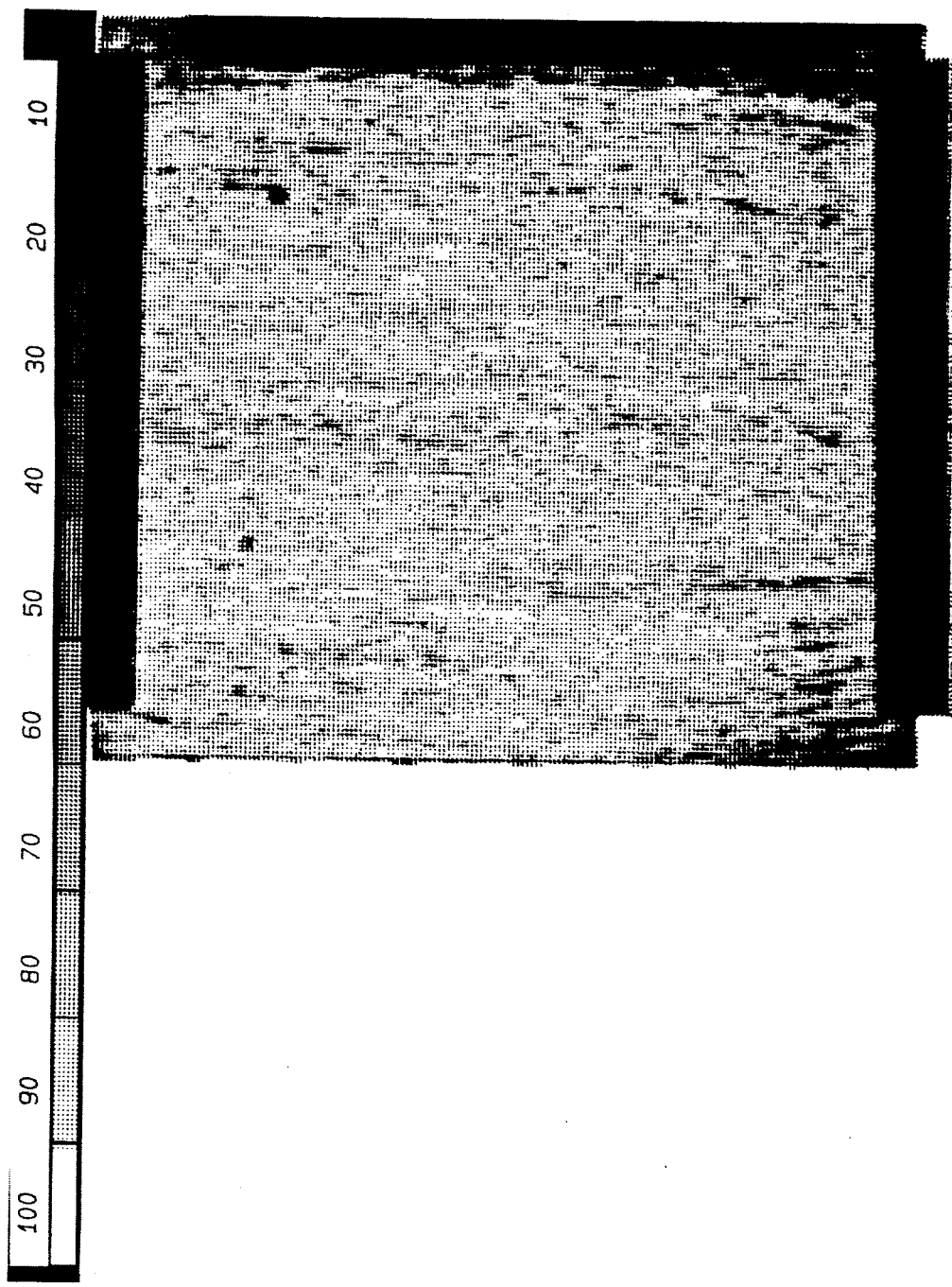
Figure 6:
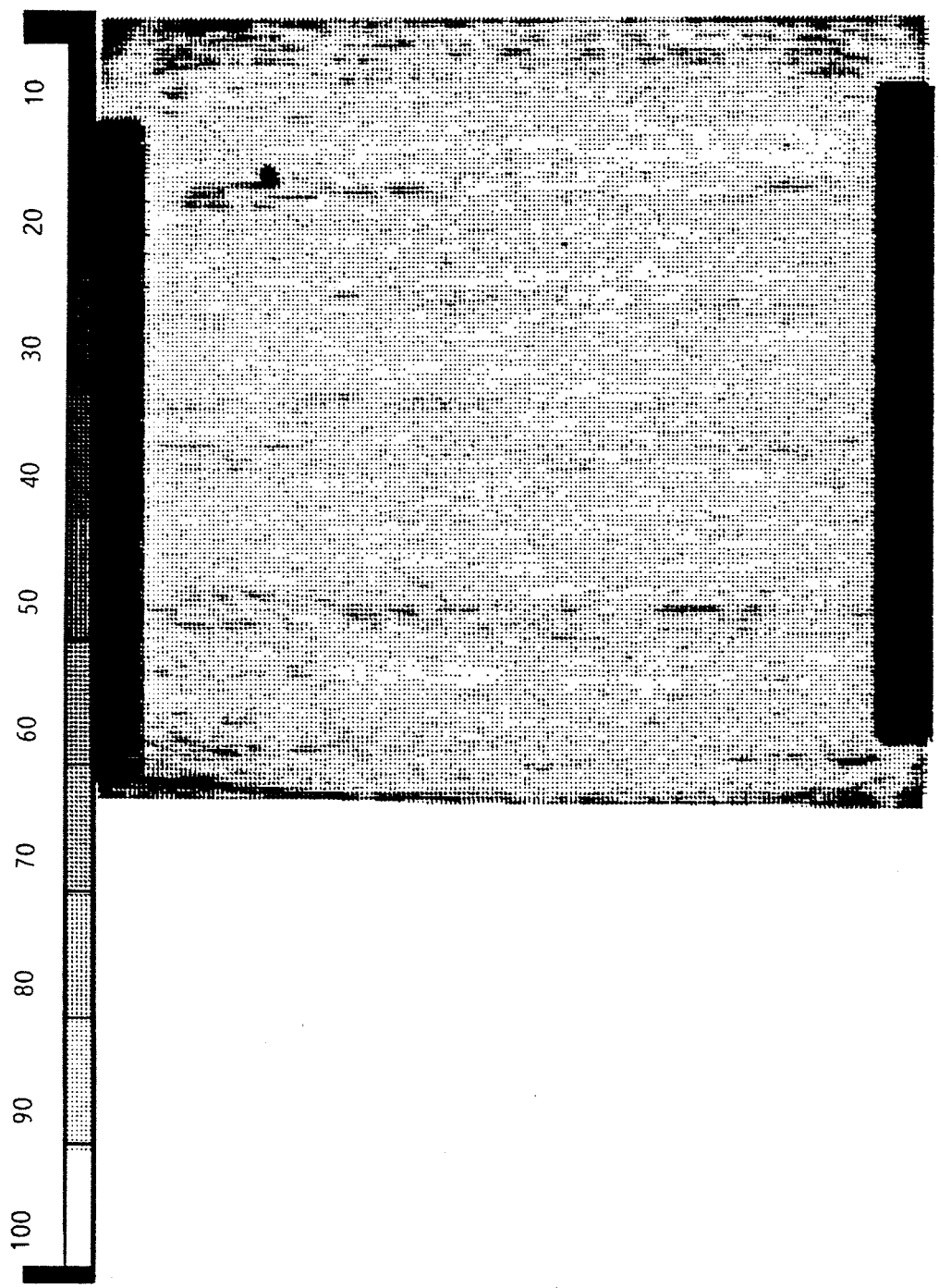
Figure 7:
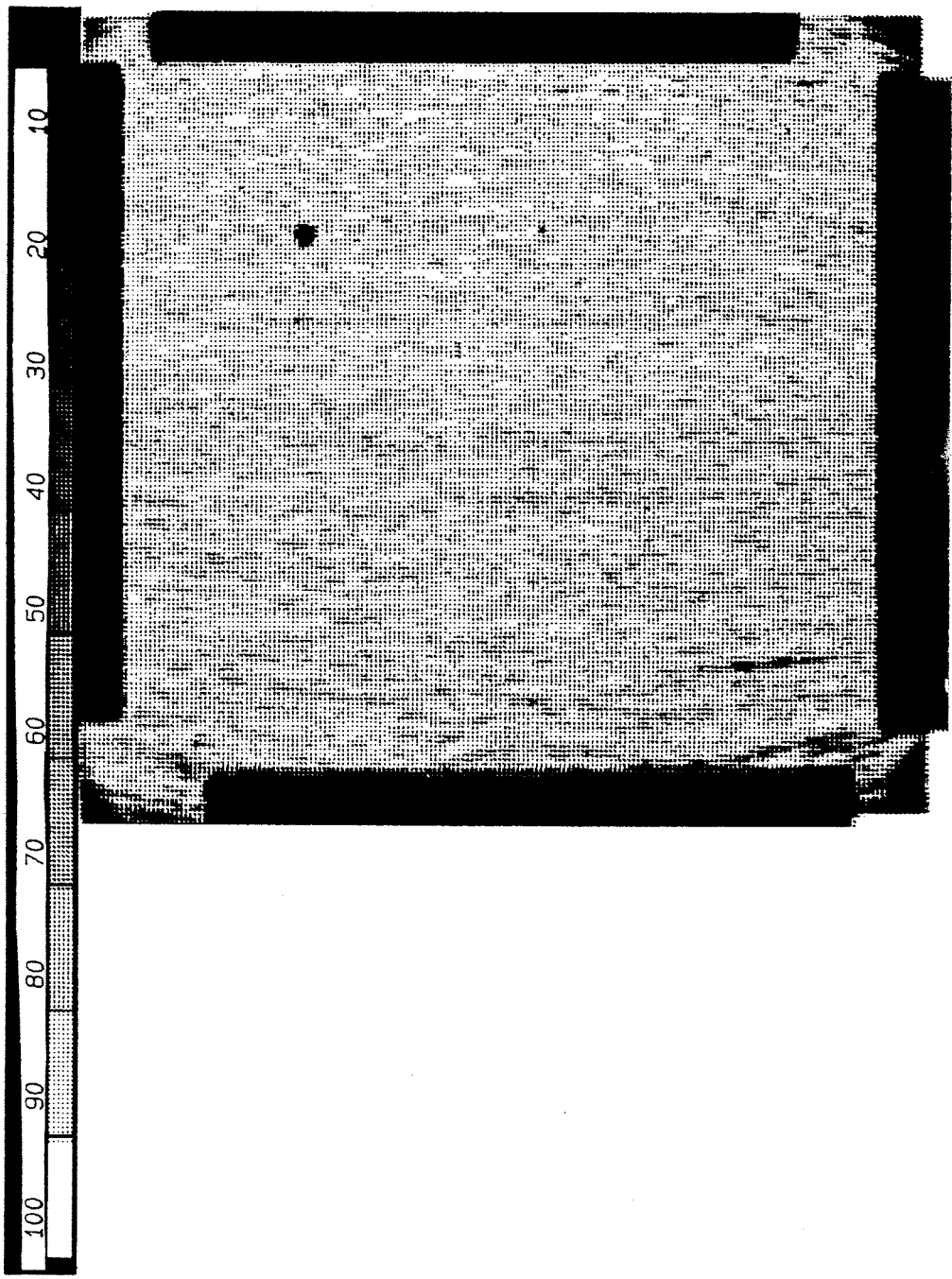
Figure 8:
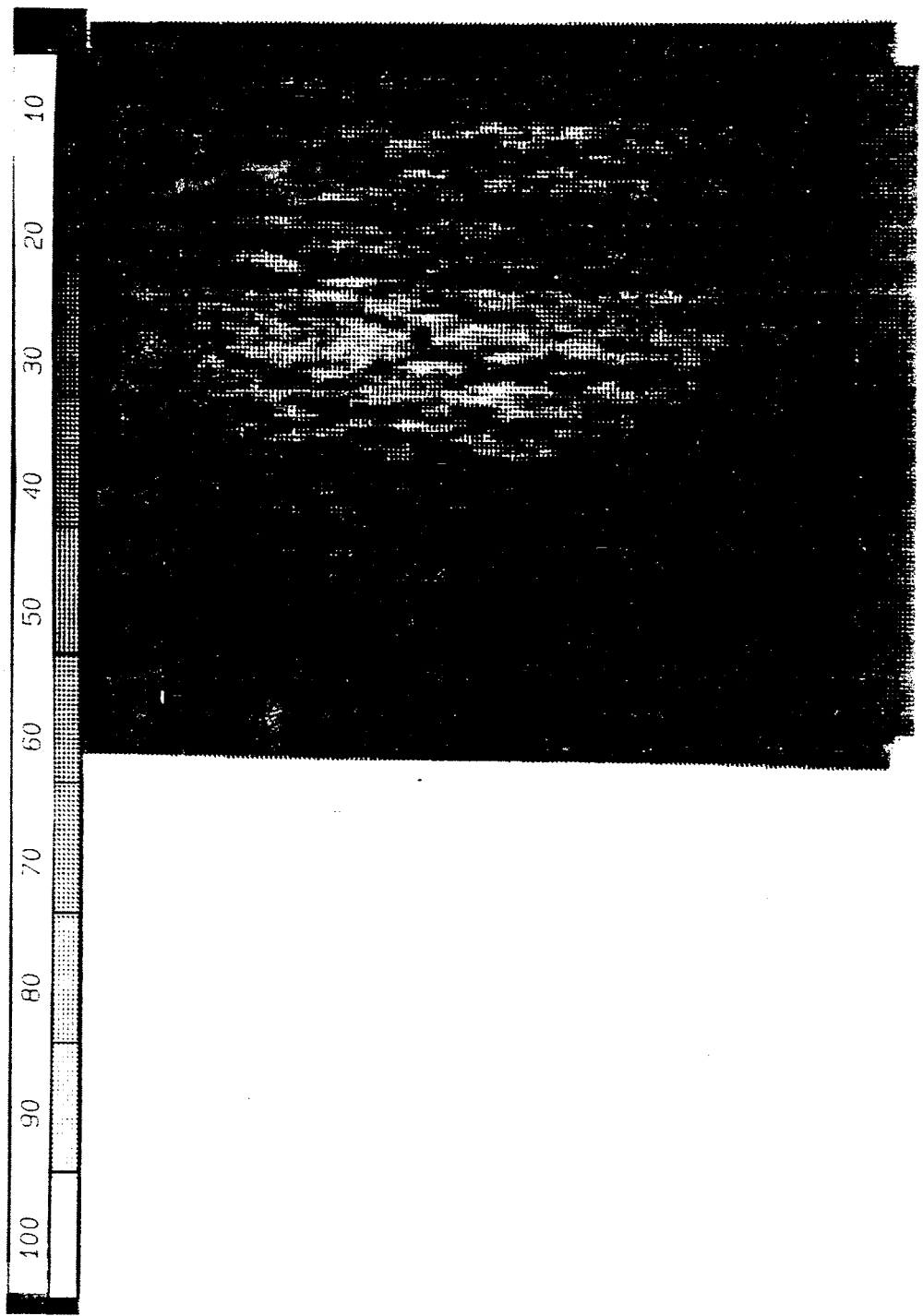
Figure 9:
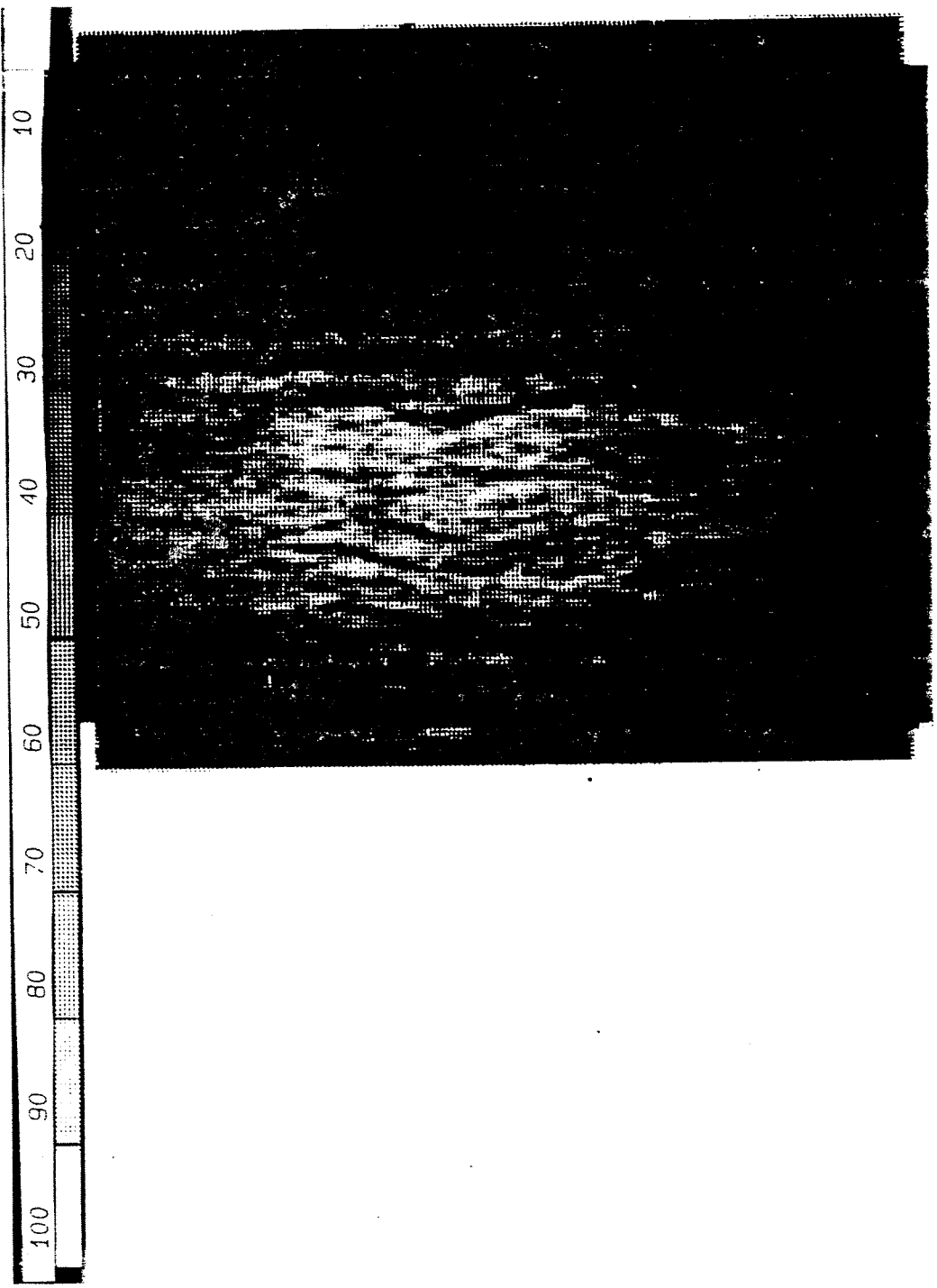
Figure 10:
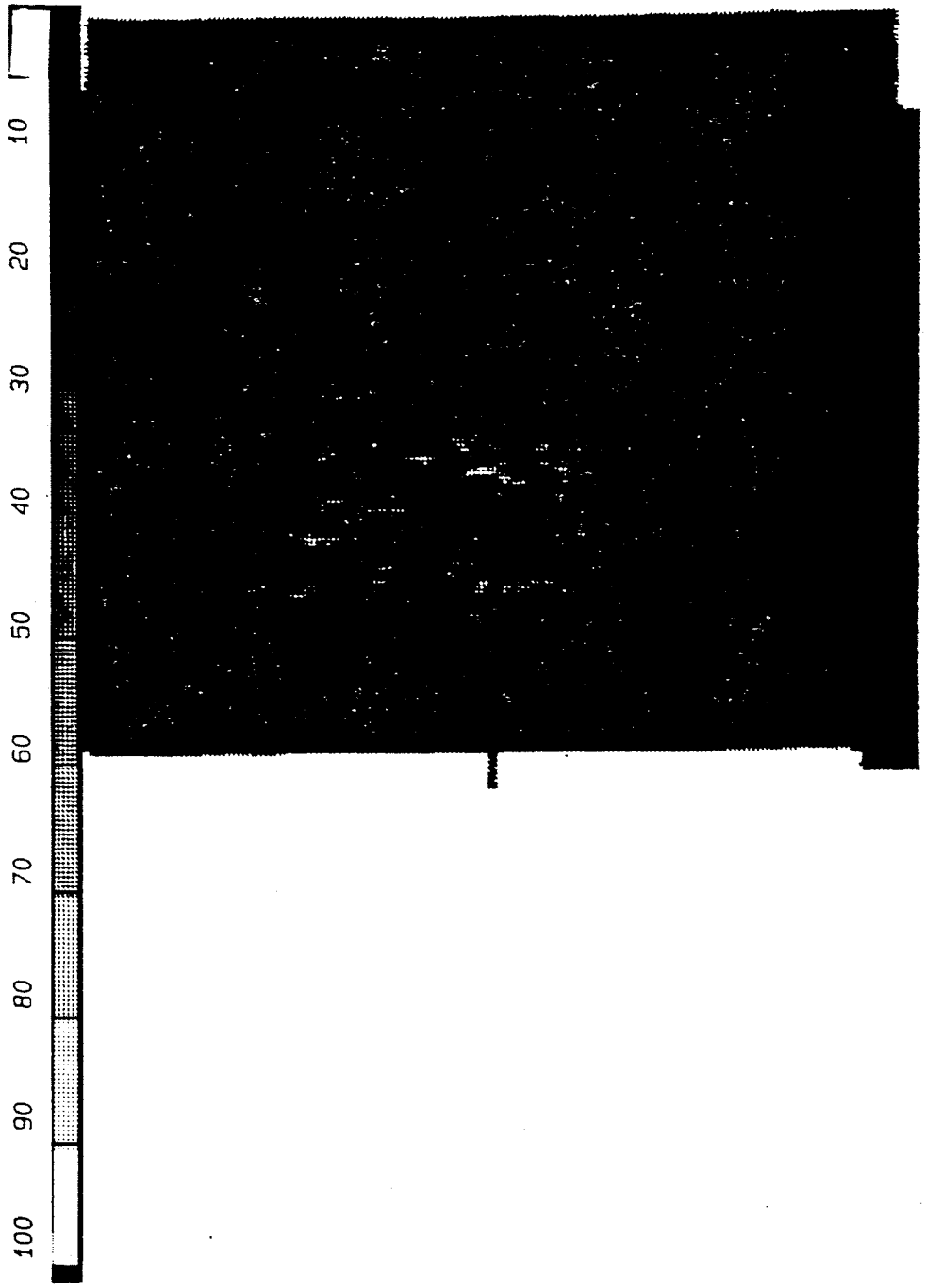
Figure 11:
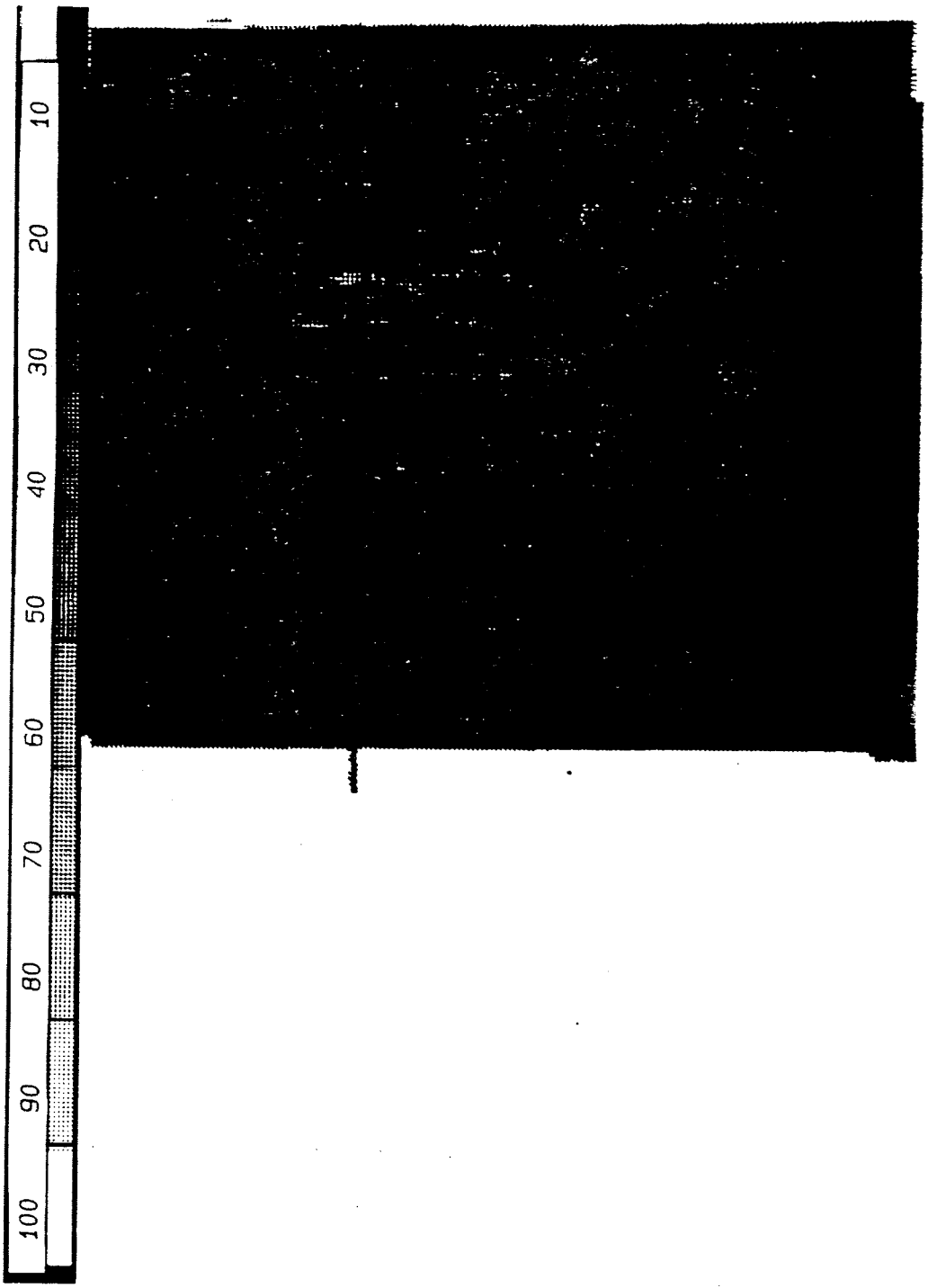

In Examples 7 and 8, a hybrid yarn was produced by intermingling 17 ends of 298 denier E-Glass HT glass fibers supplied by Owens Corning Fiberglass with one end of a 2200 denier type A polyamide yarn, A treated with 0.17 weight % of the spin finish utilized in examples 1-3 (table 1). Each strand of fiberglass contained 204 individual filaments (15,000 yd/lb = 0,240 m/Kg). The resultant partially Commingled hybrid yarn was sized with Genton ® 310 size such that the total glass finish plus yarn size was between 1.5-2.5 weight percent. This level was determined by extraction of the sized yarn and included any coupling agent and/or finish applied to the glass fibers by the manufacturer. The resultant yarn had a glass fiber volume of approximately 50.8% and a resin content of 30.3 weight percent. Laminates were prepared by frame wrapping and consolidated at 100 psi. Consolidation temperature and time as well as physical properties are tabulated in Table 3.

sized yarn of the subject invention, as compared to the water wet frame wrapped product, in order to achieve similar property levels. FIGS. 2 and 3 illustrate that 0° Flexural properties are also achieved more rapidly with the Genton ® 310 sized yarn. C-scans of the consolidated laminates show high levels of porosity for the dry (variant 2) and wetted (variant 3) unsized commingled yarns, even after lengthy consolidation. Laminates prepared from the Genton ® 310 sized yarns (variant 1) of the subject invention showed very little to no porosity, even after only ten minutes of consolidation.

FIGS. 4-14 are C-scans (5Hz and 36dB) of frame wrapped laminates consolidated at 500° F. (260° C.) and 100psi pressure for various consolidation times. FIGS. 4-7 are C-scans for the compositions of the subject invention, consolidated for 5, 10, 20, and 40 minutes, respectively. Porosity in the cured laminates is shown by dark areas. As can be seen, all these laminates (variant 1 laminates) have very little porosity, even at exceptionally short consolidation times.

Figure 12:
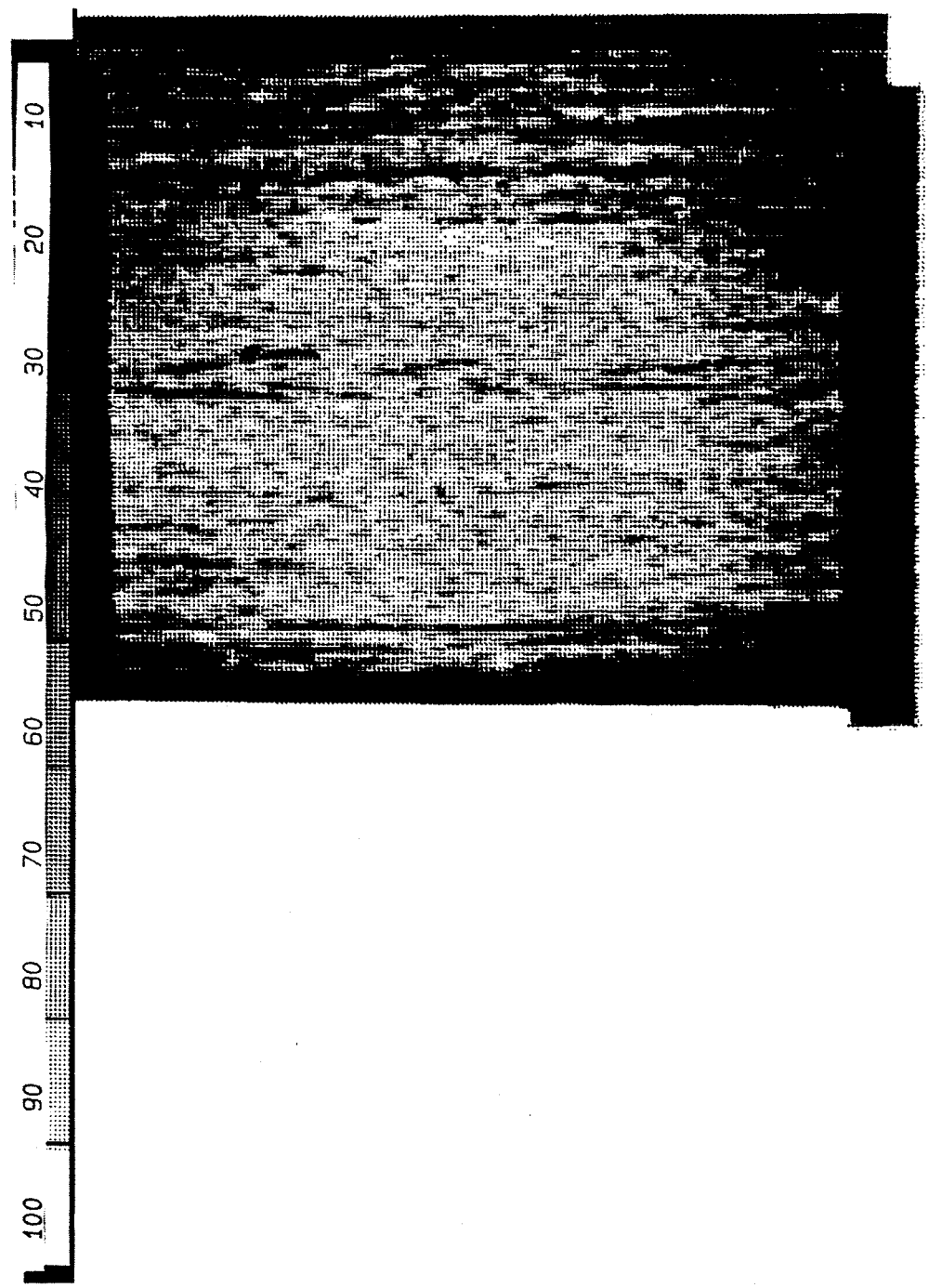
Figure 13:
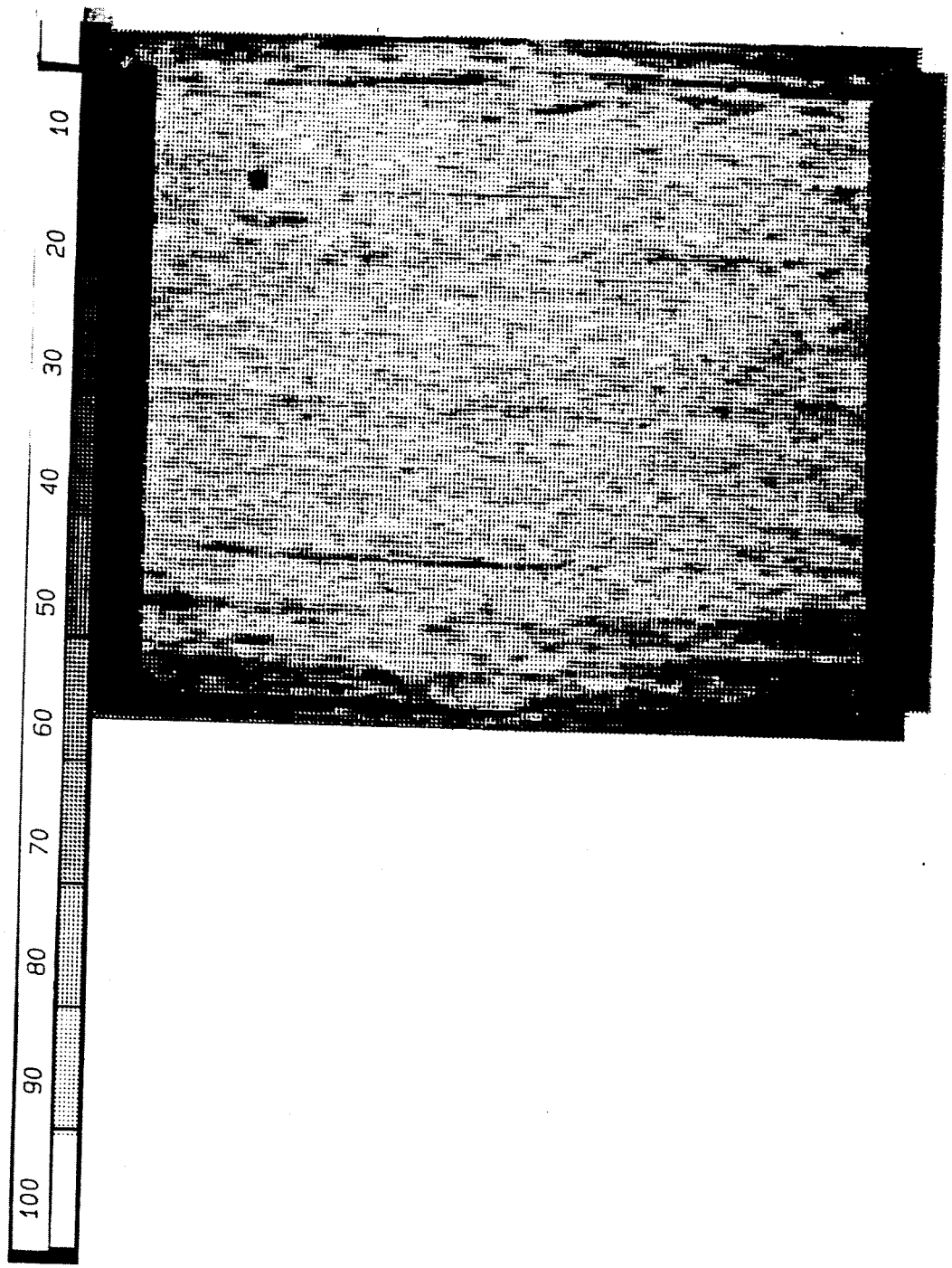
Figure 14:
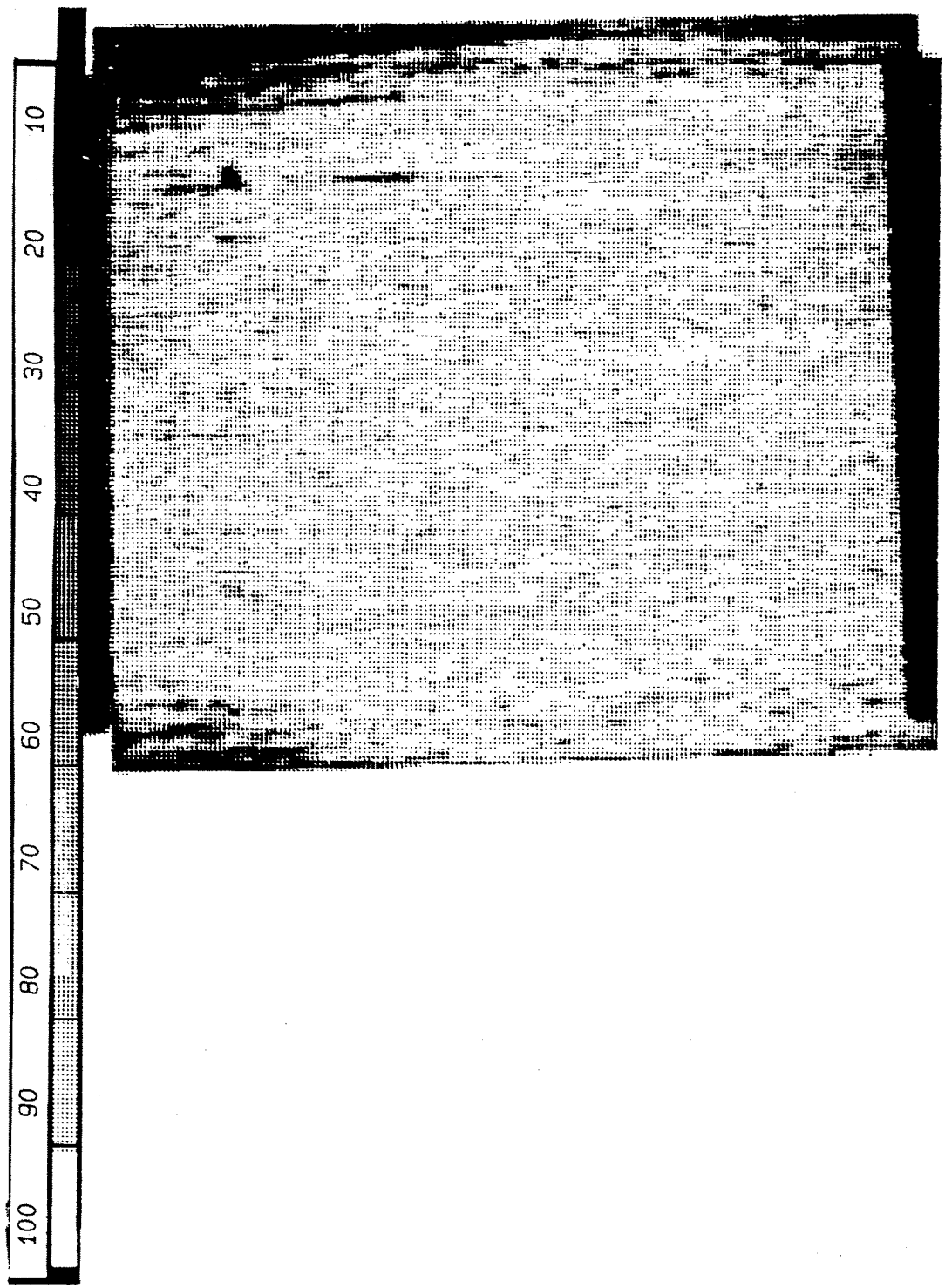

FIGS. 8-11 are C-scans for unsized commingled yarn frame wrapped laminates (variant 2 laminates) consolidated for 10, 20, 40, and 80 minutes respectively. As can be seen, all have medium high to high porosity, even after lengthy consolidation. FIGS. 12-14 are C-scans for unsized comingled yarn from wrapped laminates (variant 3 laminates) wrapped with the aid of water, and consolidated for 10, 40, and 80 minutes respectively. A

TABLE 3

| Example | Molding Temp °C. | Conditions Time, Min. | 0° Flex Properties | | 90° Tensile Properties | | |
|---|---|---|---|---|---|---|---|
| | | | STR (ksi) | MOD (msi) | STR (ksi) | MOD (msi) | STF (%) |
| 7[1] | 260 | 10 | 162 | 6.1 | 7.6 | 1.40 | 0.56 |
| 8 | 246 | 10 | 166 | 5.7 | 6.3 | 1.38 | 0.46 |
| 9 | 246 | 5 | 159 | 5.0 | 4.7 | 1.35 | 0.37 |
| 10 | 260 | 5 | 152 | 5.9 | 6.9 | 1.46 | 0.47 |

[1] Average of 3 trials.

In order to illustrate the effectiveness of the sized hybrid yarn of the subject invention, a series of frame wrapped laminates were prepared from commingled yarns (polyamide A, Celion G30-500 12K) sized with 0.6 weight percent of the preferred Genton ® 310 size (variant 1), a completely unsized commingled yarn (variant 2), and a completely unsized commingled yarn sprayed with water prior to frame wrapping to minimize decommingling during the frame wrapping operation (variant 3). In order to negate the effect of water, all frame wraps were dried at 121° C. for 1 hour prior to consolidation. In FIGS. 1, 2, and 3 are plotted the 90° Tensile Strength, 0° Flexural Strength, and 0° Flexural Modulus against processing time of the three variants described above. As can be seen from the Figures, the dry frame wrapped laminates (variant 2) did not come close to producing the levels of physical properties of either of the other yarns, whether wrapped with the aid of water (variant 3) or sized with Genton ® 310 (variant 1). FIG. 1 indicates that the Genton ® 310 sized yarn laminate achieved over 90% of its ultimate 90° tensile strength after only ten minutes.

FIG. 1 also illustrates that a four fold reduction in consolidation time is possible for the Genton ® 310 low porosity laminate was only achieved after an 80 minute consolidation time.

I claim:

1. A hybrid yarn containing reinforcing fibers and thermoplastic matrix fibers sized with a primary size dispersion comprising a dispersed phase comprising a compatible thermoplastic having a melting point below the melting point of the thermoplastic matrix fibers dispersed in a continuous phase which is a volatile liquid.

2. The hybrid yarn of claim 1 wherein the major part of said volatile liquid comprises water.

3. The hybrid yarn of claim 1 wherein said hybrid yarn is a commingled yarn.

4. The hybrid yarn of claim 1 wherein said thermoplastic matrix fibers are selected from the group consisting of the aliphatic polyamides.

5. The hybrid yarn of claim 4 wherein said aliphatic polyamide is selected from the group consisting of polycaprolactan and nylon 66.

6. A composite article prepared by the process of thermoforming the hybrid yarn of claim 1.

* * * * *